(12) United States Patent
Jagadeesan et al.

(10) Patent No.: US 7,289,810 B2
(45) Date of Patent: Oct. 30, 2007

(54) LOCATION DETECTION AND NETWORK AWARENESS FOR MULTI-MODE/MULTI-RADIO MOBILE DEVICES

(75) Inventors: Ramanathan Jagadeesan, San Jose, CA (US); Bich Nguyen, Los Altos, CA (US); Andrew Chung, Fremont, CA (US); Arthur G. Howarth, Orleans (CA)

(73) Assignee: Cisco Technology, Inc., San Jose, CA (US)

( * ) Notice: Subject to any disclaimer, the term of this patent is extended or adjusted under 35 U.S.C. 154(b) by 33 days.

(21) Appl. No.: 11/009,672

(22) Filed: Dec. 10, 2004

(65) Prior Publication Data

US 2006/0128384 A1 Jun. 15, 2006

(51) Int. Cl.
*H04Q 7/20* (2006.01)
(52) U.S. Cl. .................... 455/439; 455/437; 455/552.1; 370/331; 370/335; 340/539.29
(58) Field of Classification Search ................ 455/439, 455/437, 552.1, 11.1; 340/532.1, 572.1, 340/870.01, 539.29; 709/200; 370/318, 370/331, 335
See application file for complete search history.

(56) References Cited

U.S. PATENT DOCUMENTS

| | | | |
|---|---|---|---|
| 6,745,032 B1 * | 6/2004 | Alvesalo et al. ............ 455/436 |
| 2003/0093383 A1 * | 5/2003 | Reich et al. .................... 705/60 |
| 2003/0218995 A1 * | 11/2003 | Kim et al. .................... 370/318 |
| 2004/0116120 A1 * | 6/2004 | Gallagher et al. ........... 455/436 |
| 2004/0171373 A1 * | 9/2004 | Suda et al. .................. 455/415 |
| 2004/0202940 A1 * | 10/2004 | Kramer et al. .............. 429/306 |
| 2005/0026616 A1 * | 2/2005 | Cavalli et al. ............... 455/436 |
| 2005/0059400 A1 | 3/2005 | Jagadeesan et al. ......... 455/436 |
| 2005/0202828 A1 * | 9/2005 | Pecen et al. ................. 455/453 |
| 2005/0228853 A1 * | 10/2005 | Yamamura et al. .......... 709/200 |
| 2005/0248456 A1 * | 11/2005 | Britton et al. .......... 340/539.29 |
| 2006/0022038 A1 * | 2/2006 | Hewlin et al. .............. 235/385 |
| 2006/0083199 A1 * | 4/2006 | Yang ........................... 370/331 |

* cited by examiner

*Primary Examiner*—Danh Le
(74) *Attorney, Agent, or Firm*—Beyer Weaver LLP

(57) ABSTRACT

The present invention provides methods and devices using location detection to enable MMMDs to activate and tune to appropriate radios and networks. Some preferred embodiments use radio frequency identification ("RFID")—based location detection. Preferably, the location detection occurs at or near wireless domain boundaries. Some implementations employ proximity/boundary detection to enhance handoff triggers, which initiate handoff mechanisms between different networks, as an MMMD moves between wireless networks, via a wireless domain portal. Some implementations involve methods and devices for device validation and authorization. An MMMD is provided with local wireless network awareness, which may be used by the MMMD to have the appropriate radio turned on and properly tuned. Accordingly, the methods and devices of the present invention achieve power savings and improved handoff across networks.

46 Claims, 7 Drawing Sheets

LOCATION DETECTION AND NETWORK AWARENESS FOR MULTI-MODE/MULTI-RADIO MOBILE DEVICES

BACKGROUND OF THE INVENTION

1. Field of the Invention

The present invention relates to mobile devices. More particularly, the present invention relates to multi-mode multi-radio mobile devices.

2. Description of the Related Art

In recent years, cellular communications systems have been widely deployed throughout many parts of the world. The term "cellular" refers to communications systems, such as the Advance Mobile Phone Service ("AMPS"), that divide a geographic region into sections known as cells. The purpose of this division is to make the most use out of a limited number of transmission frequencies. In many implementations each connection, or conversation, requires its own dedicated frequency and the total number of available frequencies is on the order of 1,000. To support more than 1,000 simultaneous conversations, cellular systems allocate a set number of frequencies for each cell. Two cells can use the same frequency for different conversations so long as the cells are not adjacent to each other.

Several competing cellular systems exist, including GSM and CDMA. GSM is an acronym for Global System for Mobile Communications, one of the leading digital cellular systems. GSM uses narrowband Time Division Multiple Access ("TDMA"), which divides a radio frequency into time slots and then allocates slots to multiple calls. In this way, a single frequency can support multiple, simultaneous data channels. GSM was first introduced in 1991. As of the end of 1997, GSM service was available in more than 100 countries and has become the de facto standard in Europe and Asia.

CDMA is an acronym for Code-Division Multiple Access, which does not assign a specific frequency to each user. Instead, every channel uses the full available spectrum. Individual conversations are encoded with a pseudo-random digital sequence.

The General Packet Radio Service ("GPRS") is a standard for wireless communications that runs at speeds up to 115 kilobits per second, compared with current GSM systems' 9.6 kilobits per second. GPRS supports a wide range of bandwidths and is an efficient use of limited bandwidth. Therefore, GPRS is particularly suited for sending and receiving small bursts of data, such as e-mail and Web browsing, as well as large volumes of data.

Some wireless networks are 802.11 networks. "802.11" refers to a family of specifications developed by the IEEE for wireless local area network ("WLAN") technology. 802.11 specifies an over-the-air interface between a wireless client and a base station or between two wireless clients. There are several specifications in the 802.11 family:

802.11—applies to wireless LANs and provides 1 or 2 Mbps transmission in the 2.4 GHz band using either frequency hopping spread spectrum (FHSS) or direct sequence spread spectrum (DSSS).

802.11a—an extension to 802.11 that applies to wireless LANs and provides up to 54 Mbps in the 5 GHz band. 802.11a uses an orthogonal frequency division multiplexing encoding scheme rather than FHSS or DSSS.

802.11b (also referred to as 802.11 High Rate or Wi-Fi)—an extension to 802.11 that applies to wireless LANS and provides 11 Mbps transmission (with a fallback to 5.5, 2 and 1 Mbps) in the 2.4 GHz band. 802.11b uses only DSSS. 802.11b was a 1999 ratification to the original 802.11 standard, allowing wireless functionality comparable to Ethernet.

802.11g—applies to wireless LANs and provides more than 20 Mbps in the 2.4 GHz band.

Many cellular telephones, personal digital assistants ("PDAs") and similar devices are now configured with more than one radio in order to operate in more than one mode. This configuration allows the devices to use more than one wireless access network. Such devices will be referred to herein as multi-mode multi-radio mobile devices ("MMMDs"). MMMDs are capable of utilizing multiple wireless access networks for connectivity.

Wireless devices, including MMMDs, generally become aware of wireless network connectivity by periodically scanning for access points ("APs") or base stations, which typically transmit beacons periodically. The wireless device may then use wireless link quality metrics, or other metrics, to assess the different connectivity options.

For example, in 802.11 WLAN networks, a WLAN client may perform active or passive scanning. In active scanning mode, the wireless device turns on its radio, tunes to a particular channel and sends a probe request. The wireless device then waits for a probe response and repeats this process for all available channels until an AP is found. In passive scanning mode the wireless device turns on the radio, tunes to a channel and waits to hear the beacon from an AP. The wireless device then repeats this process for all available channels until an AP is found.

Having multiple radios active and performing periodic scanning is expensive in terms of power consumption, especially if performed frequently. It may also increase the time taken to detect and access a wireless network. It would be desirable for MMMDs to have more efficient methods and devices for evaluating and/or establishing wireless network connectivity.

SUMMARY OF THE INVENTION

The present invention provides methods and devices using location detection to enable MMMDs to activate and tune to appropriate radios and networks. Some preferred embodiments use radio frequency identification ("RFID")—based location detection. Preferably, the location detection occurs at or near wireless domain boundaries. Some implementations employ proximity/boundary detection to enhance handoff triggers, which initiate handoff mechanisms between different networks, as an MMMD moves between wireless networks, via a wireless domain portal. Some implementations involve methods and devices for device validation and authorization.

An MMMD is provided with local wireless network awareness, which may be used by the MMMD to have the appropriate radio turned on and properly tuned. Accordingly, the methods and devices of the present invention achieve power savings and improved handoff across networks.

Some aspects of the invention provide a method of establishing wireless network connectivity. The method includes the following steps: reading device identification data from a radio frequency identification ("RFID") tag of a multi-mode multi-radio mobile device ("MMMD"); and determining from the device identification data whether the MMMD is configured for communication on a first wireless network.

The method may also include the step of determining, when the MMMD is configured for communication on the first wireless network, whether the MMMD is currently associated with the first wireless network and/or whether the MMMD is authorized to access the first wireless network. The method may include the step of determining, when the MMMD is authorized to access the first wireless network, a quality of service for the MMMD.

The may include providing, when the MMMD is not currently associated with the first wireless network, access parameters for the first wireless network to the MMMD. The access parameters may be provided to the MMMD via a second wireless network identified by reference to the device identification data in the RFID tag of the MMMD. The access parameters may be provided to the MMMD via a Short Message Service message.

The method may involve determining, when the MMMD is currently associated with the first wireless network, whether the MMMD is leaving the first wireless network. The determination of whether the MMMD is leaving the first wireless network is based, at least in part, on a location of an RFID reader that read the device identification data.

The method may include the following steps when it is determined that the MMMD is leaving the first wireless network: notifying the MMMD that the MMMD is leaving the first wireless network; and triggering a handoff to a second wireless network when an active session is in progress.

Some embodiments of the invention provide a computer program for establishing wireless network connectivity. The computer program is embodied in a machine-readable medium and contains instructions for controlling one or more devices in a first wireless network to perform the following steps: receive device identification data read from a radio frequency identification ("RFID") tag of a multi-mode multi-radio mobile device ("MMMD"); and determine from the device identification data whether the MMMD is configured for communication on the first wireless network.

The computer program may include instructions for determining, when the MMMD is configured for communication on the first wireless network, whether the MMMD is currently associated with the first wireless network and/or whether the MMMD is authorized to access the first wireless network. The computer program can include instructions for determining, when the MMMD is authorized to access the first wireless network, a quality of service for the MMMD.

The computer program may include instructions for determining, when the MMMD is currently associated with the first wireless network, whether the MMMD is leaving the first wireless network. The determination of whether the MMMD is leaving the first wireless network may be based, at least in part, on a location of an RFID reader that read the device identification data.

The computer program may also include instructions for providing, when the MMMD is not currently associated with the first wireless network, access parameters for the first wireless network to the MMMD. The access parameters may be provided to the MMMD (e.g., in a Short Message Service message) via a second wireless network identified by reference to the device identification data in the RFID tag of the MMMD.

The computer program may also include instructions for performing the following steps when it is determined that the MMMD is leaving the first wireless network: notifying the MMMD that the MMMD is leaving the first wireless network; and triggering a handoff to a second wireless network when an active session is in progress.

Alternative aspects of the invention provide a network for establishing wireless network connectivity. The network includes one or more devices for reading device identification data from a radio frequency identification ("RFID") tag of an MMMD and at least one logic device for determining from the device identification data whether the MMMD is configured for communication on a first wireless network. The logic device(s) may be part of a server or other computing device associated with, or accessible by, the first wireless network.

At least one logic device in the network may be configured for determining, when the MMMD is configured for communication on the first wireless network, whether the MMMD is currently associated with the first wireless network and/or whether the MMMD is authorized to access the first wireless network. The network may also include one or more logic devices configured for determining, when the MMMD is authorized to access the first wireless network, a quality of service for the MMMD.

The network may be configured to provide, when the MMMD is not currently associated with the first wireless network, access parameters for the first wireless network to the MMMD. The access parameters may be provided to the MMMD (e.g., in a Short Message Service message) via a second wireless network identified by reference to the device identification data in the RFID tag of the MMMD.

At least one logic device of the network may also be configured for determining, when the MMMD is currently associated with the first wireless network, whether the MMMD is leaving the first wireless network. The determination of whether the MMMD is leaving the first wireless network may be based, at least in part, on a location of an RFID reader that read the device identification data. A device in the network may notify the MMMD when the MMMD is leaving the first wireless network.

Alternative implementations of the invention provide a method of establishing wireless network connectivity. The method includes the following steps: receiving, by an MMMD, access parameters for a first wireless network; turning on a radio of the MMMD that is appropriate for the first wireless network; and accessing the first wireless network according to the access parameters.

The MMMD may receive the access parameters via a Short Message Service message. The method may include these steps: receiving notification when the MMMD is leaving the first wireless network; and triggering a handoff to a second wireless network when an active session is in progress.

Some embodiments of the invention provide an MMMD that includes the following elements: a first radio configured for communication with a first wireless network; a second radio configured for communication with a second wireless network; an RFID tag that includes device identification data, the identification data comprising configuration data indicating wireless networks for which the MMMD is configured for communication; and a processor configured to turn on the first radio and access the first wireless network when access parameters for the first wireless network are received via the second radio.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention provides methods and devices using location detection to enable MMMDs to activate and tune to appropriate radios and networks. Some preferred embodiments use radio frequency identification ("RFID")— based location detection. Preferably, the location detection occurs at or near wireless domain boundaries. Some implementations employ proximity/boundary detection to enhance handoff triggers, which initiate handoff mechanisms between different networks, as an MMMD moves between wireless networks, via a wireless domain portal. Some implementations involve methods and devices for device validation and authorization.

An MMMD is provided with local wireless network awareness, which may be used by the MMMD to have the appropriate radio turned on and properly tuned. Accordingly, the methods and devices of the present invention reduce the power consumption and hence battery life of MMMDs. Moreover, these methods also enhance seamless handoff capability of MMMDs.

Because the device detection is validated from the network and the activation of the radio components may be instigated from the network messages, detection of unusable networks by a simple poll/scan & associate method are eliminated.

Some implementations of the invention use RFID-based location detection, using RFID readers at wireless domain portals, to detect that a multi-radio mobile device is in the proximity of the portal. This information can be used to alert the mobile to the wireless network options that are available in the domain it is about to enter.

One such implementation will be described in detail herein with reference to FIG. 1. In this example, MMMD 105 is a dual-mode device with 802.11 WLAN radio 115 and GSM/GPRS cellular radio 110. Here, MMMD 105 also includes RFID tag 120.

Figure 1:
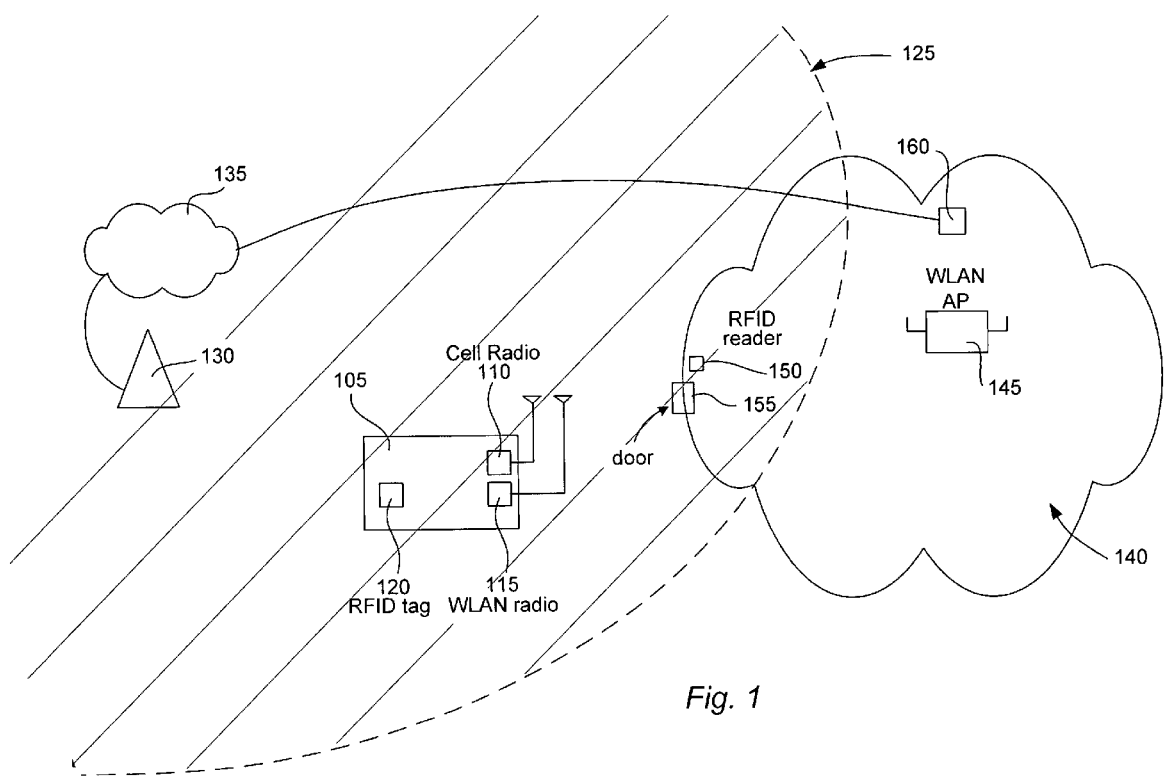
FIG. 1 is a schematic representation of an MMMD, a first wireless network and a second wireless network.

At the moment depicted in FIG. 1, MMMD 105 is within cell 125, which is controlled by cellular base station 130. Cellular base station 130 is configured for communication with Internet 135.

Likewise, WLAN 140 is also configured for communication with Internet 135. WLAN 140 includes a WLAN AP 145 and one or more RFID readers 150, preferably located at a wireless domain portal such as door 155. Moreover, WLAN 140 includes location aware wireless network ("LAWN") server 160. RFID reader 150 and the other RFID readers are configured to send detection events to LAWN server 160.

WLAN 140 may be scaled to different sizes. In various implementations, WLAN 140 may extend throughout a building, a shopping mall, an airport, a convention center, etc. In this example, the RFID readers are placed at doorways to an Enterprise building and act as wireless domain portal locators.

Figure 2:
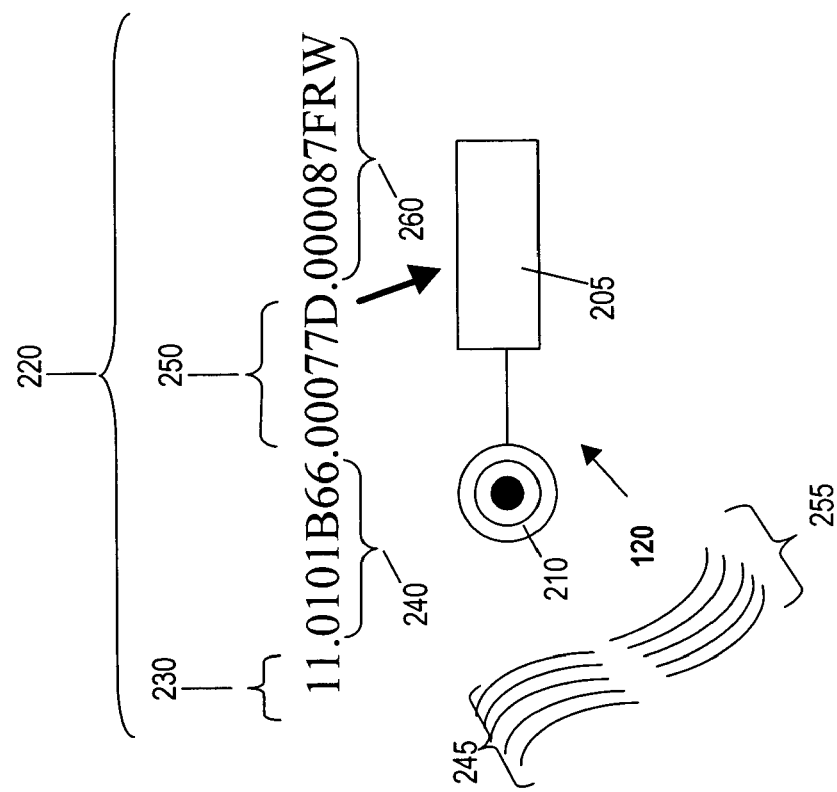
FIG. 2 is a diagram illustrating an RFID tag.

As shown in FIG. 2, an RFID tag 120 includes microprocessor 205 and antenna 210. In this example, RFID tag 120 is powered by a magnetic field 245 generated by RFID reader 150. The tag's antenna 210 picks up the magnetic signal 245. RFID tag 120 modulates the signal 245 according to information coded in the tag and transmits the modulated signal 255 to the RFID reader 150.

RFID tags use the Electronic Product Code ("EPC" or "ePC") format for encoding information. An EPC code includes variable length bits of information (common formats are 64, 96 and 128 bits), which allows for identification of individual products as well as associated information. As shown in FIG. 2, EPC 220 includes header 230, EPC Manager field 240, Object class field 250 and serial number field 260. EPC Manager field 240 contains manufacturer information. Object class field 250 includes a product's stock-keeping unit ("SKU") number. Serial number field 260 is a 40-bit field that can uniquely identify the specific instance of an individual product i.e., not just a make or model, but also down to a specific "serial number" of a make and model.

Accordingly, an RFID tag may be used to identify uniquely an MMMD. Moreover, RFID tag 120 can indicate various types of information about MMMD 105, including but not limited to the types of wireless networks on which an MMMD may be configured to communicate. This indication may be direct or indirect.

Figure 3:
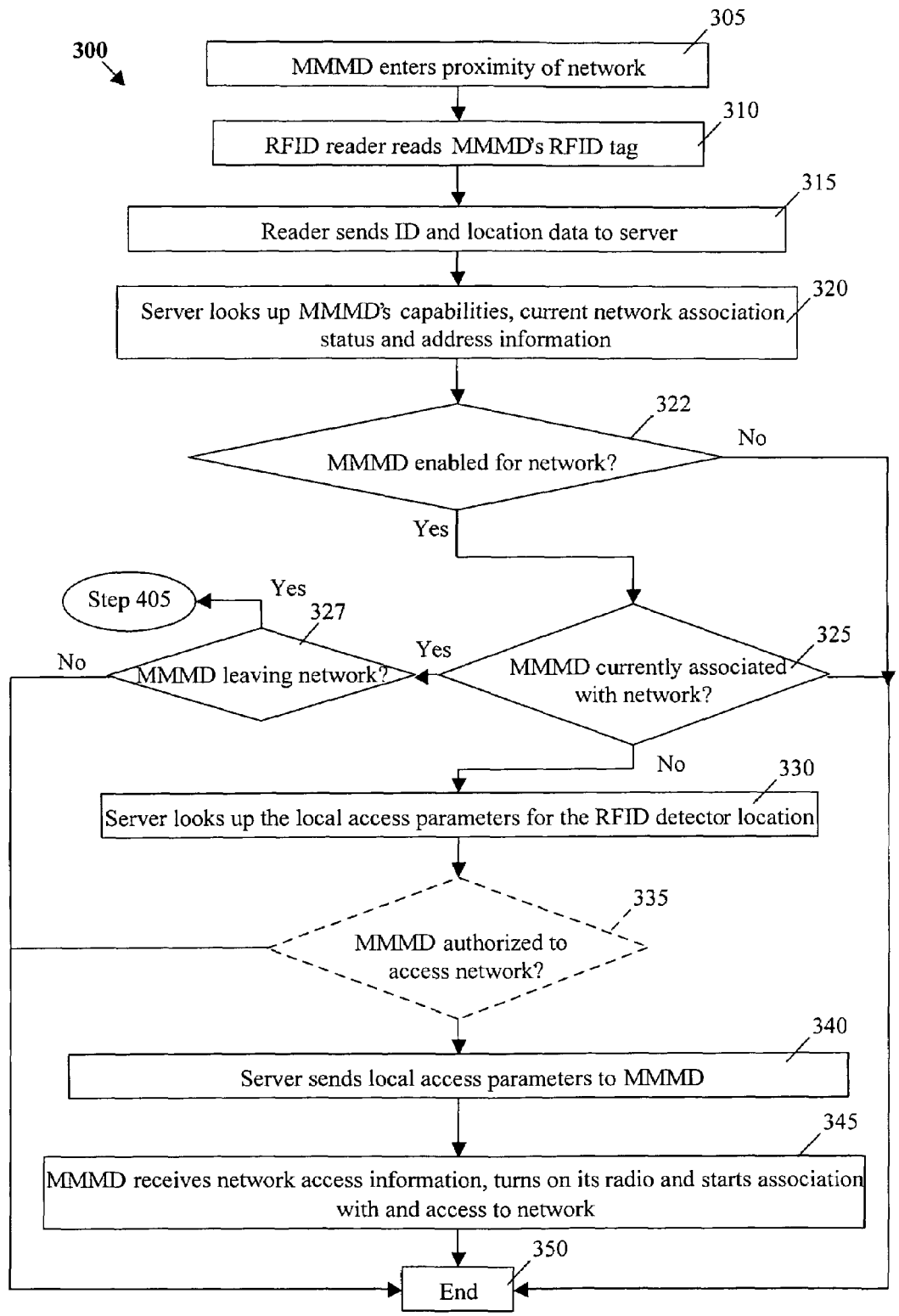
FIG. 3 is a flow chart that provides an overview of some implementations of the present invention.

One exemplary method 300 of the present invention will now be described with reference to the flow chart of FIG. 3 and the network diagram of FIG. 1. Those of skill in the art will appreciate that the steps of the methods discussed herein, including methods 300 and 400, need not be performed (and in some implementations are not performed) in the order shown. Similarly, although many of the steps of methods 300 and 400 are described as being performed by LAWN server 160, it will also be apparent that these steps could be performed by one or more other devices associated with WLAN 140, e.g., other network devices, host devices, etc. Moreover, some implementations of the methods discussed herein may include more or fewer steps than those shown, e.g., in FIGS. 3 and 4.

In step 305, MMMD 105 enters the vicinity of RFID reader 150. In this example, cell radio 110 of MMMD 105 is switched on and MMMD 105 is able to communicate via cellular network 125. When MMMD 105 is close enough, RFID reader 150 reads RFID tag 120 and sends a signal to LAWN server 160 (step 315). In this example, the signal includes the unique device ID for MMMD 105, which may be an EPC. For example, RFID tag 120 may indicate the make and model of an MMMD.

Having this information, LAWN sewer 160 (or some other device) may determine (e.g. from a look-up table in a local or remote database) the types of wireless networks on which MMMD 105 may be configured to communicate, MMMD's 105' current, default and/or best-cost network association and MMMD's 1052' network address. (Step 320.)

As a threshold matter, LAWN server 160 should determine whether MMMD 105 is, or can be, configured for communication on WLAN 140 (step 322). If not, the process ends (step 350). If so, LAWN server 160 determines whether MMMD 105 is currently associated with WLAN 140. If not, LAWN server 160 estimates that MMMD 105 is entering the domain of WLAN 140, based on the fact that it is not registered on the WLAN. If MMMD 105 is currently associated with WLAN 140, the process continues to step 327.

Although the foregoing description, in connection with the location of MMMD 105 shown in FIG. 1, suggests that MMMD 105 is entering WLAN 140, the methods of the present invention also provide for situations in which an MMMD may be leaving the network within which these determinations are made. Accordingly, in step 327, LAWN server 160 determines whether MMMD 105 is leaving the network. This determination may be made, for example, if an MMMD that is currently associated with WLAN 140 has returned to the proximity of an exit. If MMMD 105 is leaving the network, the process continues to step 405 of method 400.

If it is determined in step 325 that MMMD 105 is not currently associated with WLAN 140, LAWN server 160 then uses location information to lookup the local wireless access information and parameters of the domain the mobile device is entering. The location information may be, for example, determined by the location of RFID reader 150.

In some preferred implementations, LAWN server 160 may validate MMMD 105 and determines whether MMMD 105 is authorized to access WLAN 140 (step 335) before sending access information to MMMD 105. Moreover, LAWN server 160 may have an interface to the WLAN management function (such as WLSE or WDS which has a mapping between physical topology and WLAN radio/network topology) or may even be co-located with it. Optionally, LAWN server 160 along with the WLAN management function may use additional data such as QoS, admission control and active load parameters to determine the appropriate local WLAN access information and parameters to send to the mobile device.

If MMMD 105 is authorized to access WLAN 140, LAWN server 160 sends local access parameters (and possibly other configuration information) to MMMD 105 at its current or default address. (Step 340.) In this example, the default access network for MMMD 105 is cellular network 125 and the default access address for MMMD 105 is its directory number ("DN"). The local access parameters (and other information, if any) may be sent, for example, on cellular network 125 via Internet 135. The access method may be, for example, Short Message Service ("SMS").

Upon receiving the local wireless network information, MMMD 105 turns on WLAN radio 115, sets the appropriate access parameters and starts association and access to WLAN 140. If an active session is in progress, MMMD 105 may also initiate a handoff from cellular network 125 to WLAN network 140.

Figure 4:
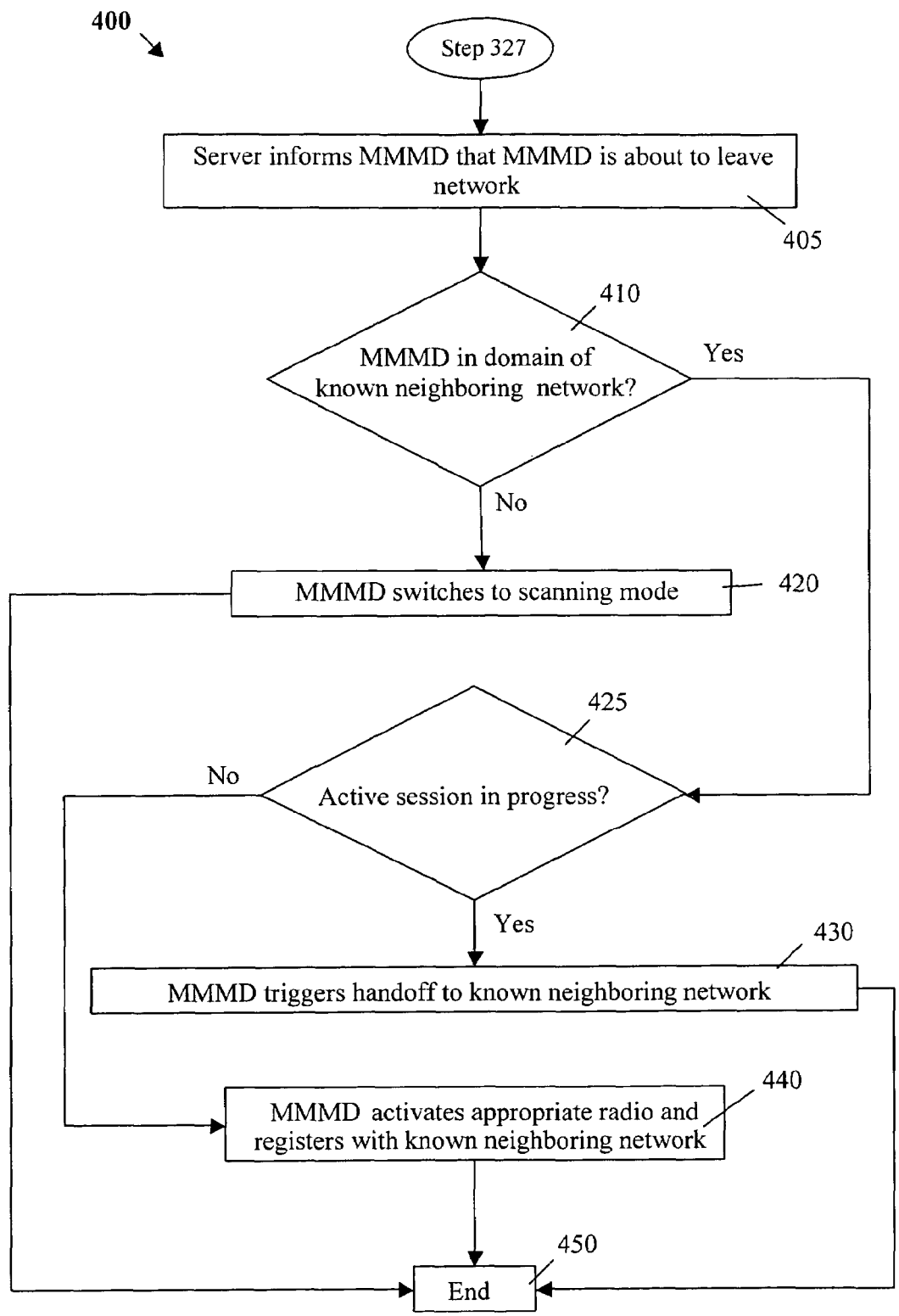
FIG. 4 is a flow chart that provides an overview of methods of the present invention.

Method 400 will now be described with reference to FIGS. 1 and 4. Method 400 is applicable when, for example, MMMD 105 moves from WLAN 140 to cellular network 125. Here, method 400 begins when it is determined in step 327 that an MMMD currently associated with WLAN 140 appears to be leaving WLAN 140.

For example, when MMMD 105 is once again detected at a portal RFID reader, the reader sends a signal to LAWN server 160, including location information for the RFID reader. LAWN server 160 looks up the current network association status and address information and estimates that MMMD 105 may be leaving WLAN 140. (Step 327.)

In step 405, LAWN server 160 informs MMMD 105 that it is about to leave WLAN 140. In this example, LAWN server 160 sends this information to MMMD 105 over the WLAN network, using the current address of MMMD 105.

In step 410, it is determined whether MMMD 105 is in or near the domain of an existing wireless network. This determination may be made by LAWN server 160, by MMMD 105 or by another device. In this example, the determination is made by LAWN server 160. According to a database accessible by LAWN server 160, the default access network for MMMD 105 is cellular network 125 and therefore LAWN server 160 indicates to MMMD 105 that MMMD 105 is in or near cellular network 125. If MMMD 105 is not known to be in or near an existing wireless network, MMMD may switch to a scanning mode in order to find an available wireless network (step 420).

In step 425, it is determined whether MMMD 105 is currently engaged in an active session on WLAN 140. If an active session is in progress, MMMD 105 may use information regarding the known neighboring wireless network, along with other handoff trigger metrics and criteria, to pre-trigger or trigger a handoff to the neighboring wireless network (here, to cellular network 125). (Step 430.)

If no active session is in progress, MMMD 105 may simply activate a radio suitable for the neighboring wireless network (in this example, its GSM/GPRS radio) and start registration with the neighboring wireless network (here, with cellular network 125).

Figure 5:
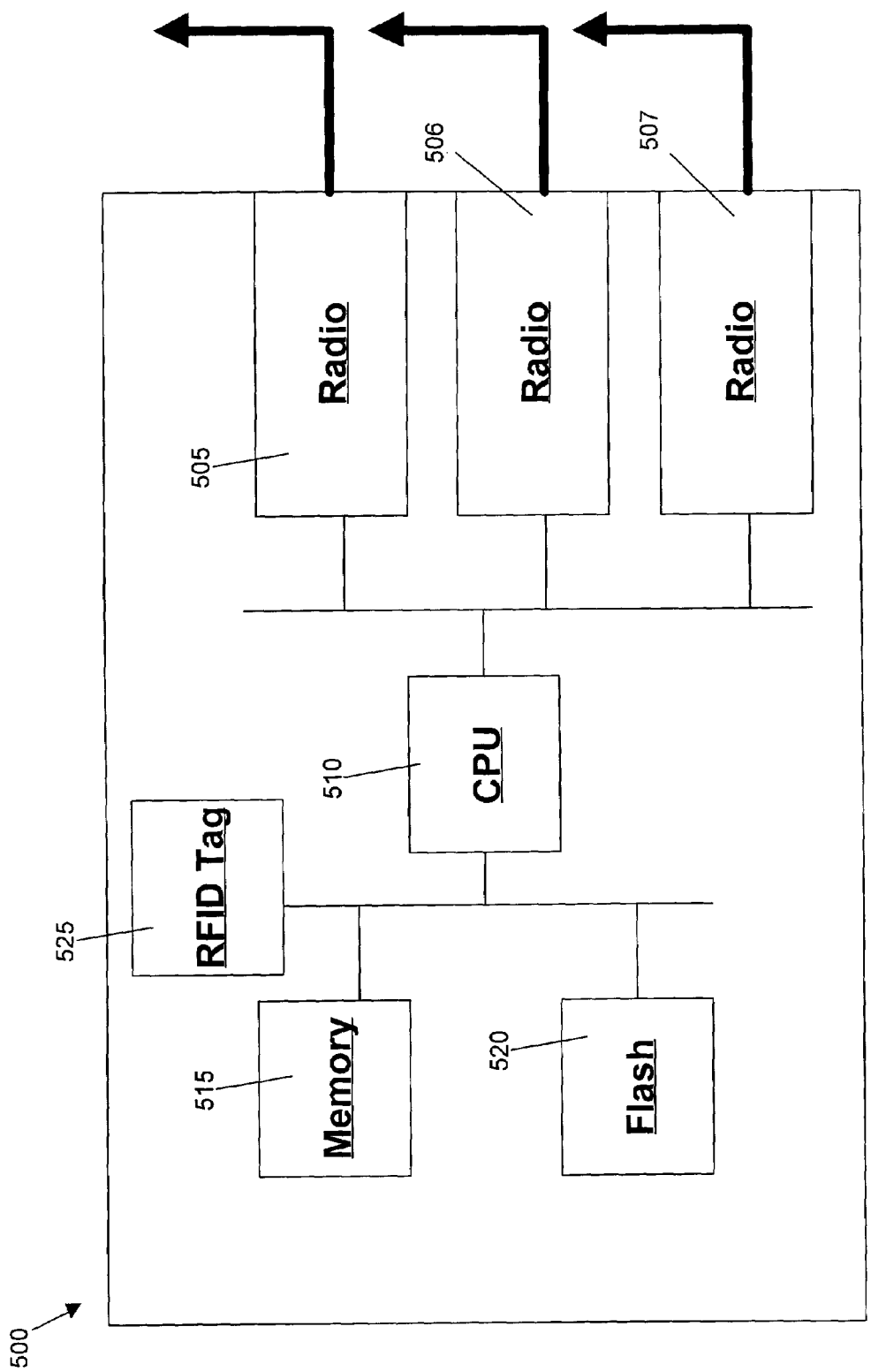
FIG. 5 is a block diagram illustrating an MMMD that may be used in accordance with the present invention.

FIG. 5 is a block diagram that illustrates some of the components of an MMMD that may be used to implement the present invention. MMMD 500 is a "tri-mode" device that includes radios 505, 506 and 507. RFID tag 525 may be substantially similar to RFID tag 120, as described above with reference to FIG. 1. Although RFID tag 525 is shown as being in communication with other components of MMMD 500, in other embodiments RFID tag is not so connected.

Flash memory 520 is used to store a program (a "bootloader") for booting/initializing MMMD 500. The bootloader, which is usually stored in a separate, partitioned area of flash memory 520, also allows RFID reader 150 to recover from a power loss, etc.

Information, including but not limited to information received on any of radios 505, 506 and 507, may be stored in memory 515. In addition to the information discussed above, new versions of the image file (e.g., the running, base image necessary to operate the MMMD 500) are copied into flash memory 620.

CPU 510 may be used to control other components of MMMD 500, e.g., in response to information received (e.g., information from LAWN server 160). For example, CPU may control one or more of radios 505, 506 and 507 according to step 345 of method 300, or according to step 440 of method 400.

Figure 6:
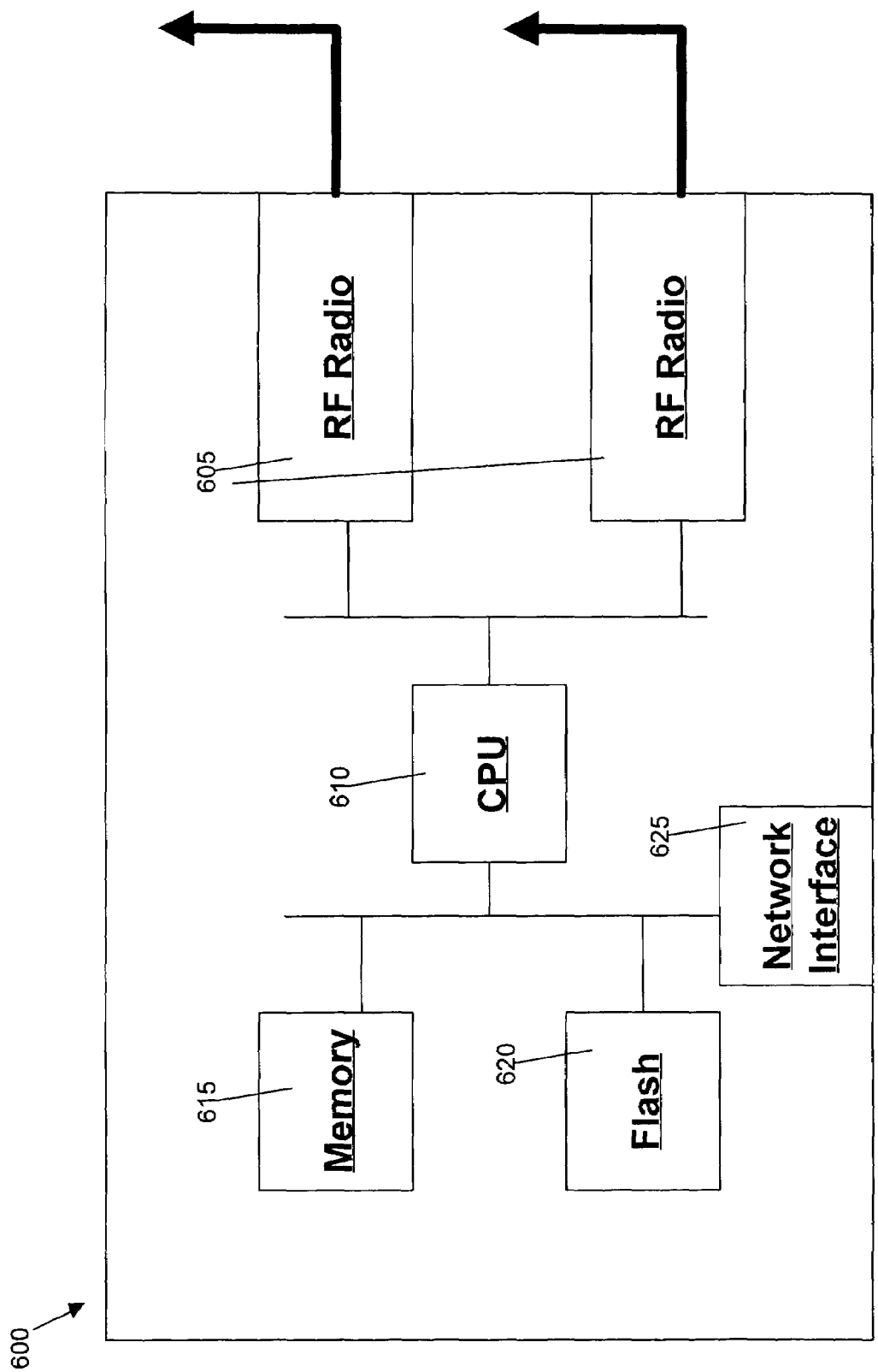
FIG. 6 is a block diagram of an exemplary RFID reader that may be configured to perform some methods of the present invention.

FIG. 6 illustrates an RFID reader that can be configured to perform methods of the present invention. RFID reader 150 includes one or more RF radios 605 for transmitting RF waves to, and receiving modulated RF waves from, RFID tags. RF radios 605 provide raw RF data that is converted by an analog-to-digital converter (not shown) and conveyed to other elements of RFID reader 150. In some embodiments, these data are stored, at least temporarily, by CPU 610 in memory 615 before being transmitted to other parts of WLAN 140 (e.g., to LAWN server 160) via network interface 625. Network interface 625 may be any convenient type of interface, such as an Ethernet interface.

Flash memory 620 is used to store a bootloader for booting/initializing RFID reader 150. Configuration information may be downloaded from, e.g., LAWN server 160 to memory 615. Updates may be instigated by LAWN server 160 or selected, trusted devices. New versions of the image file (e.g., the running, base image necessary to operate the RFID device) are copied into flash memory 620. Alternative embodiments of RFID devices implement the methods of the present invention yet lack flash memory.

Newer RFID devices also include dry contact input/output leads to connect to signal lights, industrial networks or the equivalent. These newer RFID devices typically have evolved in the amount of memory, flash, CPU capacity and methods of determination of the number, type and content of RFID tags in their field of view.

Figure 7:
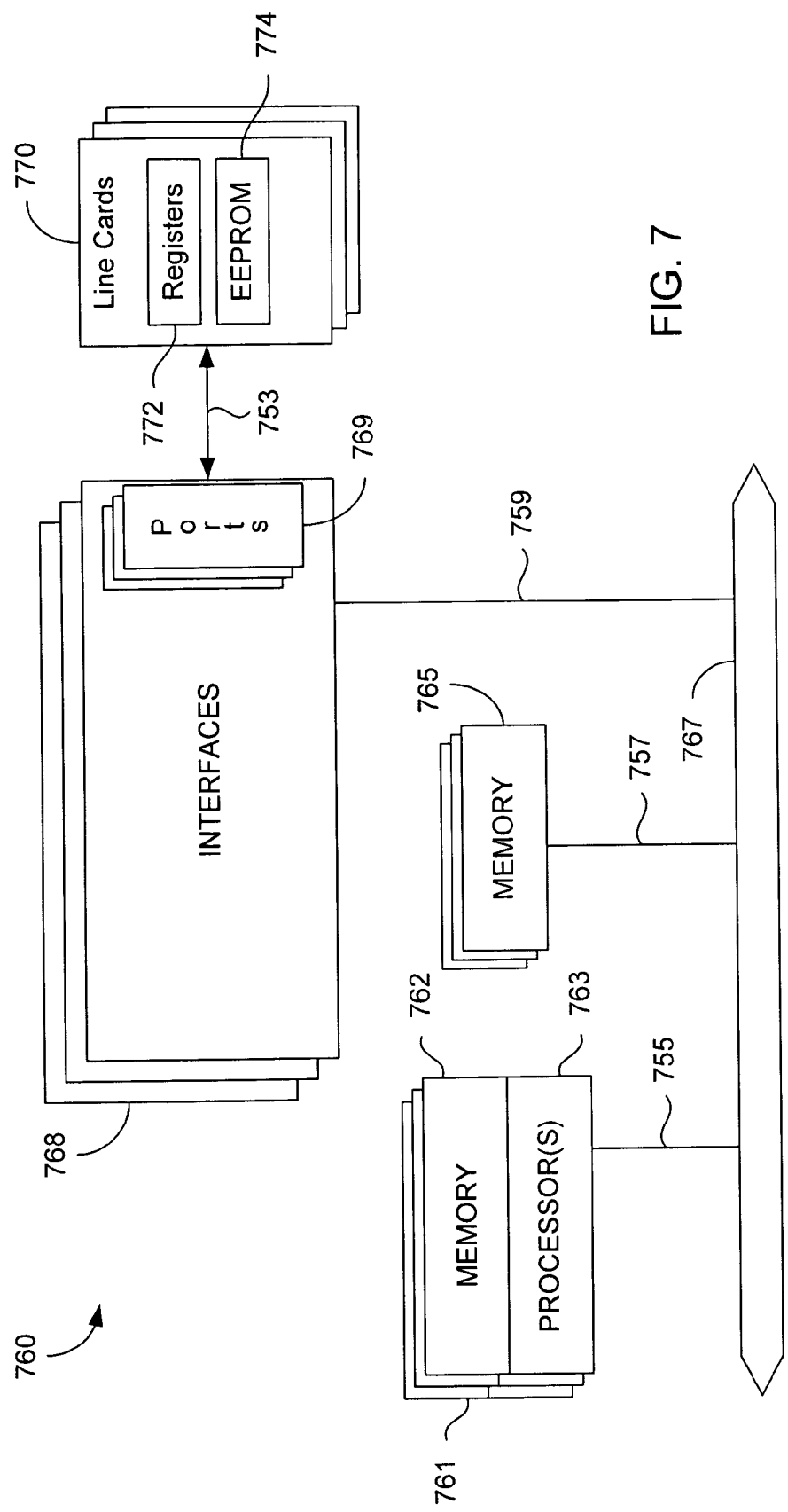
FIG. 7 illustrates an example of a network device that may be configured to implement some methods of the present invention.

FIG. 7 illustrates an example of a network device that may be configured to implement some methods of the present invention. For example, network device 760 may be configured to perform the functionality of LAWN server 160.

Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "line cards"). Generally, interfaces 768 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g. Linux, VxWorks, etc.), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/line cards may be bus based (as shown in FIG. 7) or switch fabric based (such as a cross-bar).

OTHER EMBODIMENTS

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. A method of establishing wireless network connectivity, the method comprising:

reading device identification data from a radio frequency identification ("RFID") tag of a multi-mode multi-radio mobile device ("MMMD");

determining from the device identification data whether the MMMD is configured for communication on a first wireless network;

determining, when the MMMD is configured for communication on the first wireless network, whether the MMMD is currently associated with the first wireless network; and providing, when the MMMD is not currently associated with the first wireless network, access parameters for the first wireless network to the MMMD;

wherein the access parameters are provided to the MMMD via a second wireless network identified by reference to the device identification data in the RFID tag of the MMMD.

2. The method of claim 1, further comprising determining, when the MMMD is configured for communication on the first wireless network, whether the MMMD is authorized to access the first wireless network.

3. The method of claim 2, further comprising determining, when the MMMD is authorized to access the first wireless network, a quality of service for the MMMD.

4. The method of claim 1, further comprising determining, when the MMMD is currently associated with the first wireless network, whether the MMMD is leaving the first wireless network.

5. The method of claim 4, further comprising the following steps when it is determined that the MMMD is leaving the first wireless network:

notifying the MMMD that the MMMD is leaving the first wireless network; and triggering a handoff to a second wireless network when an active session is in progress.

6. The method of claim 4, wherein the determination of whether the MMMD is leaving the first wireless network is based, at least in part, on a location of an RFID reader that read the device identification data.

7. The method of claim 1, wherein the access parameters are provided to the MMMD via a Short Message Service message.

8. A computer program for establishing wireless network connectivity, the computer program embodied in a machine-readable medium and containing instructions for controlling one or more devices in a first wireless network to perform the following steps:

receive device identification data read from a radio frequency identification ("RFID") tag of a multi-mode multi-radio mobile device ("MMMD");

determine from the device identification data whether the MMMD is configured for communication on the first wireless network; and controlling one or more devices in the first wireless network to provide, when the MMMD is not currently associated with the first wireless network, access parameters for the first wireless network to the MMMD, wherein the access parameters are provided to the MMMD via a second wireless network identified by reference to the device identification data in the RFID tag of the MMMD.

9. The computer program of claim 8, further comprising instructions for controlling one or more devices in the first wireless network to determine, when the MMMD is configured for communication on the first wireless network, whether the MMMD is currently associated with the first wireless network.

10. The computer program of claim 9, further comprising instructions for controlling one or more devices in the first wireless network to determine, When the MMMD is currently associated with the first wireless network, whether the MMMD is leaving the first wireless network.

11. The computer program of claim 10, further comprising instructions for controlling one or more devices in the first wireless network to perform the following steps when it is determined that the MMMD is leaving the first wireless network:

notify the MMMD that the MMMD is leaving the first wireless network; and trigger a handoff to a second wireless network when an active session is in progress.

12. The computer program of claim 10, wherein the determination of whether the MMMD is leaving the first wireless network is based, at least in part, on a location of an RFID reader that read the device identification data.

13. The computer program of claim 8, further comprising instructions for controlling one or more devices in the first wireless network to determine, when the MMMD is configured for communication on the first wireless network, whether the MMMD is authorized to access the first wireless network.

14. The computer program of claim 13, further comprising instructions for controlling one or more devices in the first wireless network to determine, when the MMMD is authorized to access the first wireless network, a quality of service for the MMMD.

15. The computer program of claim 8, wherein the access parameters are provided to the MMMD via a Short Message Service message.

16. A network for establishing wireless network connectivity, the network comprising:

means for reading device identification data from a radio frequency identification ("RFID") tag of a multi-mode multi-radio mobile device ("MMMD");

means for determining from the device identification data whether the MMMD is configured for communication on a first wireless network; and means for providing, when the MMMD is not currently associated with the first wireless network, access parameters for the first wireless network to the MMMD wherein the access parameters are provided to the MMMD via a second wireless network identified by reference to the device identification data in the RFID tap of the MMMD.

17. The network of claim 16, wherein the determining means further comprises means for determining, when the MMMD is configured for communication on the first wireless network, whether the MMMD is currently associated with the first wireless network.

18. The network of claim 17, wherein the determining means further comprises means for determining, when the MMMD is currently associated with the first wireless network, whether the MMMD is leaving the first wireless network.

19. The network of claim 18, further comprising means for notifying the MMMD when it is determined that the MMMD is leaving the first wireless network.

20. The network of claim 18, wherein the determination of whether the MMMD is leaving the first wireless network is based, at least in part, on a location of an RFID reader that read the device identification data.

21. The network of claim 16, wherein the determining means further comprises means for determining, when the MMMD is configured for communication on the first wireless network, whether the MMMD is authorized to access the first wireless network.

22. The network of claim 21, wherein the determining means further comprises means for determining, when the MMMD is authorized to access the first wireless network, a quality of service for the MMMD.

23. The network of claim 16, wherein the access parameters are provided to the MMMD via a Short Message Service message.

24. A method of establishing wireless network connectivity, the method comprising:
  receiving, by a multi-mode multi-radio mobile device ("MMMD"), access parameters for a first wireless network based on the device identification data read from the MMMD;
  turning on a radio of the MMMD that is appropriate for the first wireless network;
  accessing the first wireless network according to the access parameters,
  receiving notification when the MMMD is leaving the first wireless network; and
  triggering a handoff to a second wireless network when an active session is in progress,
  wherein the access parameters are received via a Short Message Service message.

25. The method of claim 24, further comprising reading the identification data from a radio frequency identification ("RFID") tag of the MMMD.

26. A multi-mode multi-radio mobile device ("MMMD"), comprising:
  a first radio configured for communication with a first wireless network;
  a second radio configured for communication with a second wireless network;
  a radio frequency identification ("RFID") tag that includes device identification data, the identification data comprising configuration data indicating wireless networks for which the MMMD is configured for communication;
  a processor configured to turn on the first radio and access the first wireless network when access parameters for the first wireless network are received via the second radio; and
  a first server configured to determine whether the MMMD is currently associated with the first wireless network, wherein the first server is configured to determine whether the MMMD is authorized to access the first wireless network.

27. The device of claim 26, further comprising an RFID reader to read the device identification data.

28. The device of claim 26, wherein the first server is configured to determine whether the MMMD leaves the first wireless network based upon a location of the RFID reader.

29. The device of claim 26, wherein the second wireless network further comprises a second server configured to determine whether the MMMD is currently associated with the second wireless network.

30. The device of claim 29, wherein the second server is configured to determine whether the MMMD is authorized to access the second wireless network.

31. The device of claim 29, wherein the second server is configured to determine whether the MMMD leaves the second wireless network based upon a location of the RFID reader.

32. The device of claim 29, wherein the second server is configured to determine, when the MMMD is authorized to access the second wireless network, a quality of service for the MMMD.

33. the device of claim 26, wherein the first server is configured to determine, when the MMMD is authorized to access the first wireless network, a quality of service for the MMMD.

34. A method of establishing wireless network connectivity, the method comprising:
  reading device identification data from a radio frequency identification ("RFID") tag of a multi-mode multi-radio mobile device ("MMMD");
  determining from the device identification data whether the MMMD is configured for communication on a first wireless network;
  determining, when the MMMD is currently associated with the first wireless network, whether the MMMD is leaving the first wireless network; and
  determining, when the MMMD is configured for communication on the first wireless network, whether the MMMD is authorized to access the first wireless network.

35. The method of claim 34, further comprising determining, when the MMMD is configured for communication on the first wireless network, whether the MMMD is currently associated with the first wireless network.

36. The method of claim 35, further comprising providing, when the MMMD is not currently associated with the first wireless network, access parameters for the first wireless network to the MMMD.

37. The method of claim 36, wherein the access parameters are provided to the MMMD via a second wireless network identified by reference to the device identification data in the RFID tag of the MMMD.

38. The method of claim 34, further comprising the following steps when it is determined that the MMMD is leaving the first wireless network;
  notifying the MMMD that the MMMD is leaving the first wireless network; and
  triggering a handoff to a second wireless network when an active session is in progress.

39. The method of claim 34, wherein the determination of whether the MMMD is leaving the first wireless network is based, at least in part, on a location of an RFID reader that read the device identification data.

40. A computer program for establishing wireless network connectivity, the computer program embodied in a machine-readable medium and containing instructions for controlling one or more devices in a first wireless network to perform the following steps:
  receive device identification data read from a radio frequency identification ("RFID") tag of a multi-mode multi-radio mobile device ("MMMD");
  determine from the device identification data whether the MMMD is configured for communication on the first wireless network;
  receive instructions for controlling one or more devices in the first wireless network to determine, when the MMMD is currently associated with the first wireless network, whether the MMMD is leaving the first wireless network; and
  control one or more devices in the first wireless network to determine, when the MMMD is configured for communication on the first wireless network, whether the MMMD is authorized to access the first wireless network.

41. The computer program of claim 40, further comprising instructions for controlling one or more devices in the first wireless network to determine, when the MMMD is configured for communication on the first wireless network, whether the MMMD is currently associated with the first wireless network.

42. The computer program of claim 41, further comprising instructions for controlling one or more devices in the first wireless network to provide, when the MMMD is not currently associated with the first wireless network, access parameters for the first wireless network to the MMMD.

43. The computer program of claim 42, wherein the access parameters are provided to the MMMD via a second wireless network identified by reference to the device identification data in the RFID tag of the MMMD.

44. The computer program of claim 41, further comprising instructions for controlling one or more devices in the first wireless network to determine, when the MMMD is authorized to access the first wireless network, a quality of service for the MMMD.

45. The computer program of claim 40, further comprising instructions for controlling one or more devices in the first wireless network to perform the following steps when it is determined that the MMMD is leaving the first wireless network:
  notify the MMMD that the MMMD is leaving the first wireless network; and
  trigger a handoff to a second wireless network when an active session is in progress.

46. The computer program of claim 40, wherein the determination of whether the MMMD is leaving the first wireless network is based, at least in part, on a location of an RFID reader that read the device identification data.

* * * * *